US006952216B2

(12) United States Patent
Rai

(10) Patent No.: US 6,952,216 B2
(45) Date of Patent: *Oct. 4, 2005

(54) HIGH PERFORMANCE GRAPHICS CONTROLLER

(75) Inventor: Barinder Singh Rai, Surrey (CA)

(73) Assignee: Seiko Epson Corporation, Tokyo (JP)

(*) Notice: Subject to any disclaimer, the term of this patent is extended or adjusted under 35 U.S.C. 154(b) by 258 days.

This patent is subject to a terminal disclaimer.

(21) Appl. No.: 10/131,631

(22) Filed: Apr. 24, 2002

(65) Prior Publication Data

US 2003/0052889 A1 Mar. 20, 2003

Related U.S. Application Data

(60) Provisional application No. 60/323,534, filed on Sep. 18, 2001.

(51) Int. Cl.[7] .................................................. G06T 1/00

(52) U.S. Cl. ...................................... 345/522; 345/531

(58) Field of Search ................................ 345/501, 503, 345/531, 522, 536, 534; 711/154, 100; 710/5

(56) References Cited

U.S. PATENT DOCUMENTS

| | | | | | |
|---|---|---|---|---|---|
| 5,299,309 | A | * | 3/1994 | Kuo et al. | 345/541 |
| 5,587,957 | A | * | 12/1996 | Kowalczyk et al. | 365/230.03 |
| 5,818,464 | A | | 10/1998 | Wade | |
| 5,917,505 | A | | 6/1999 | Larson | |
| 6,078,338 | A | | 6/2000 | Horan et al. | |
| 6,088,701 | A | | 7/2000 | Whaley et al. | |
| 6,091,431 | A | | 7/2000 | Saxena et al. | |
| 6,160,560 | A | | 12/2000 | Keller et al. | |
| 6,184,908 | B1 | | 2/2001 | Chan et al. | |
| 2002/0078163 | A1 | * | 6/2002 | Gregg | 711/165 |

* cited by examiner

*Primary Examiner*—Kee M. Tung
(74) *Attorney, Agent, or Firm*—Mark P. Watson

(57) ABSTRACT

A high performance graphics controller. The graphics controller includes a logic circuit adapted to respond to a first issued command from the CPU by checking whether the graphics controller chip is ready to carry out the first command and, if not, to continue checking while sending a signal to the CPU indicating that the graphics controller chip is ready to receive a second command from the CPU.

16 Claims, 8 Drawing Sheets

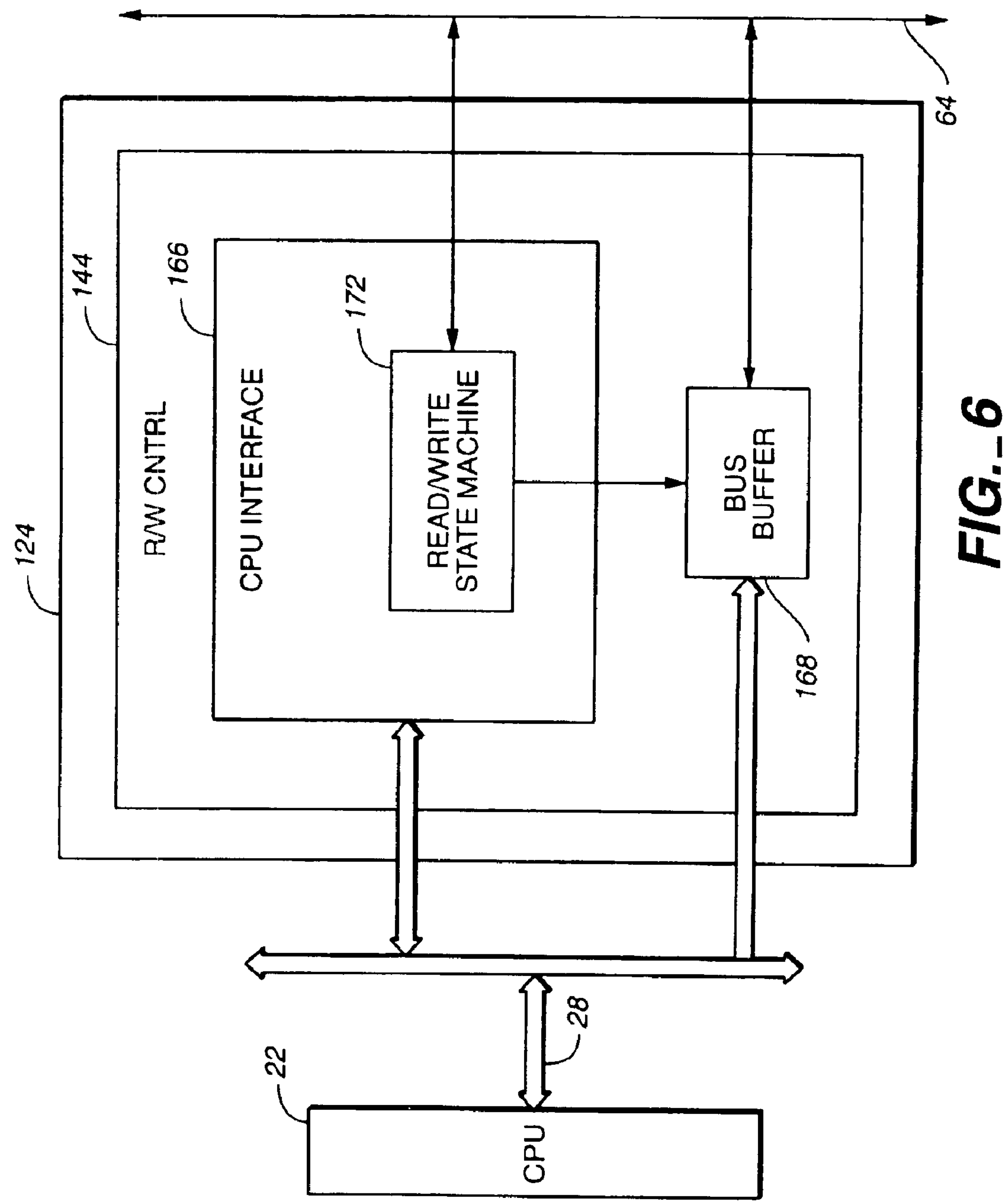
FIG._6

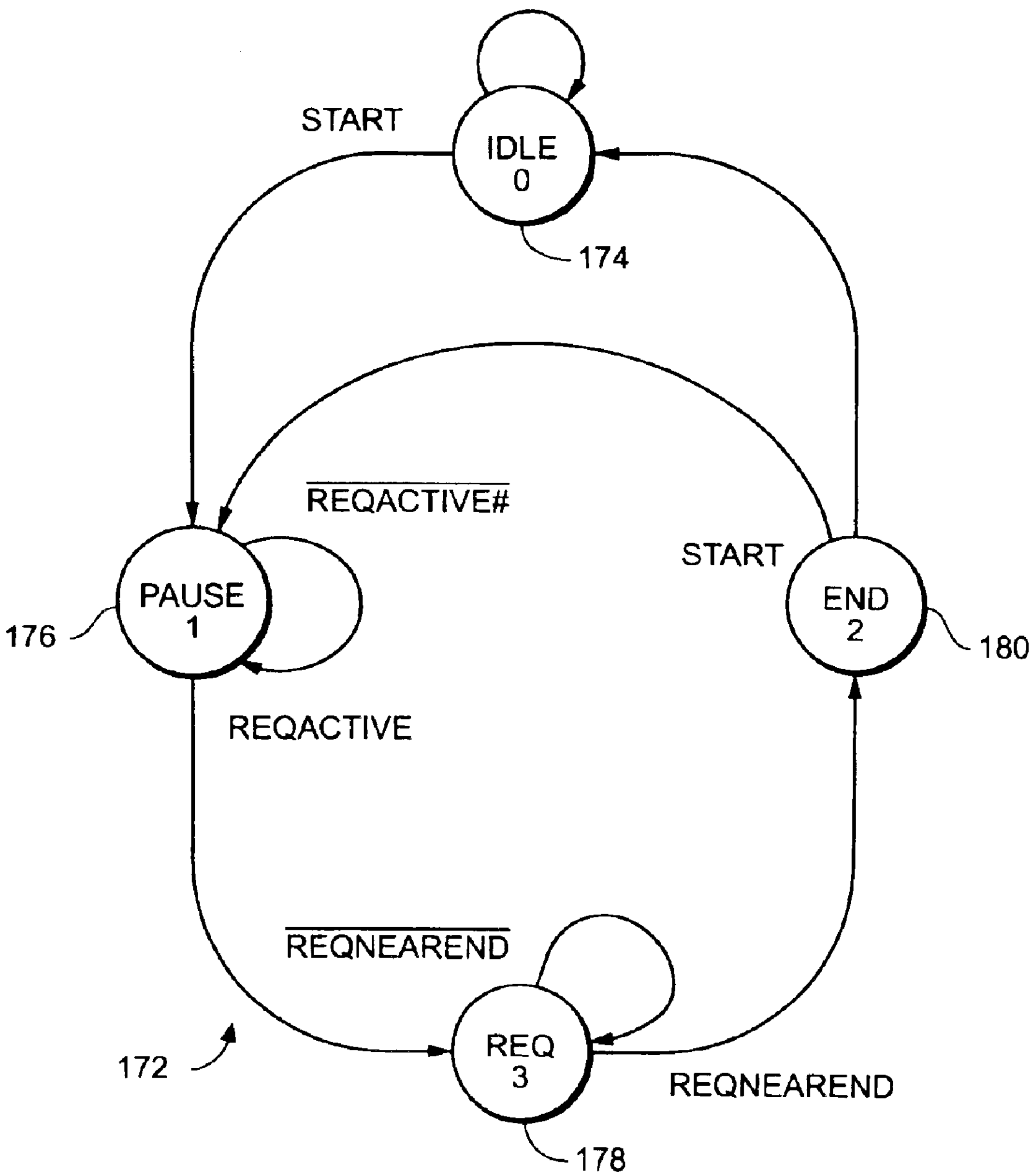
FIG._7

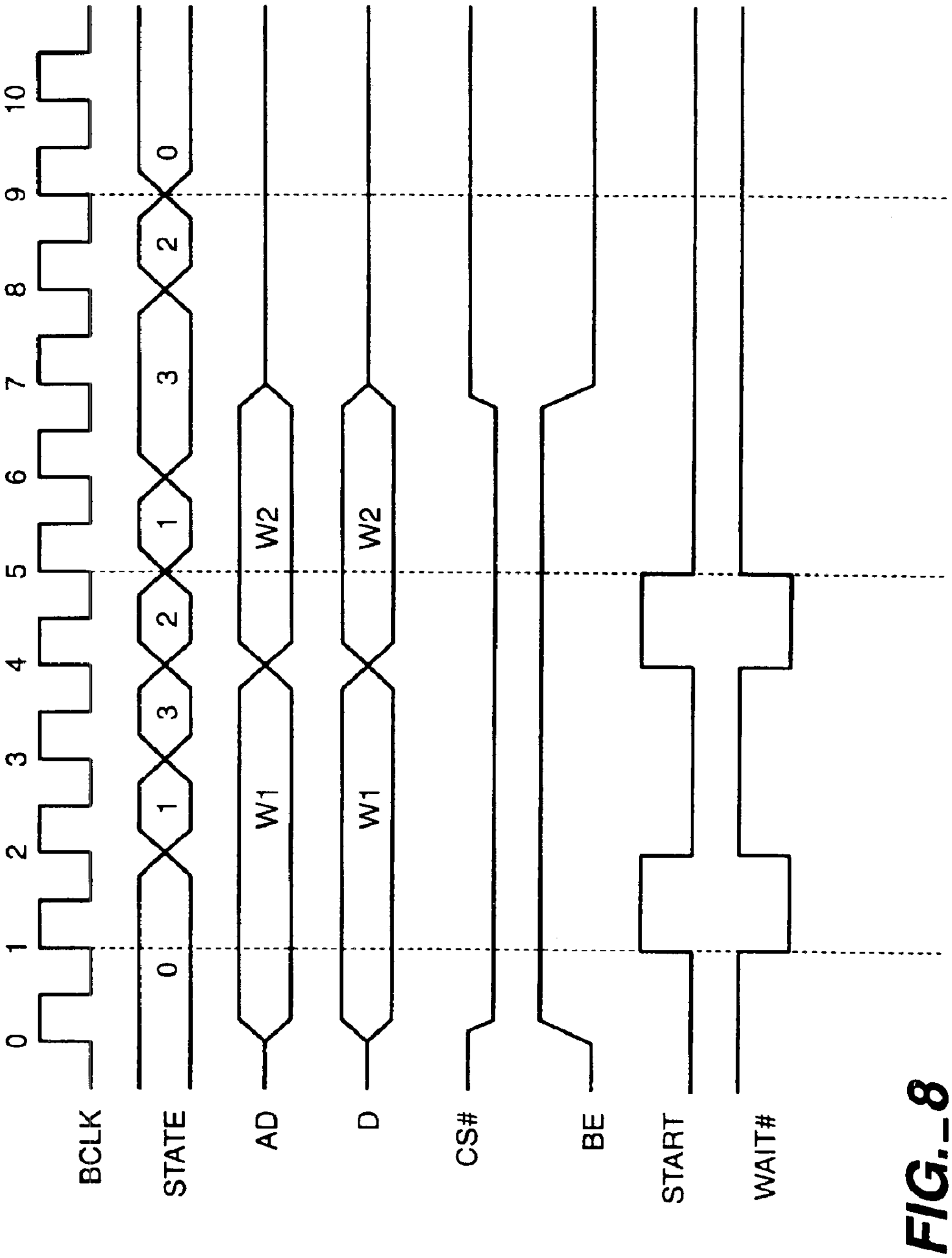
FIG._8

HIGH PERFORMANCE GRAPHICS CONTROLLER

CONTINUING APPLICATION DATA

This application claims the benefit of U.S. Provisional Application No. 60/323,534 filed Sep. 18, 2001 under 35 U.S.C. §119(e).

FIELD OF THE INVENTION

The present invention relates to a high performance graphics controller. More particularly, the present invention is directed to a graphics controller for regulating the transmission of command information between a computer's central processing unit ("CPU") and the graphics controller in such a way that the time that the CPU is required to wait before it can issue a new command is minimized.

BACKGROUND OF THE INVENTION

A common practice in the art of computer architecture is to move frequently performed and computationally intensive operations from the CPU to a special purpose functional unit, such as a graphics controller. The graphics controller is typically a separate integrated circuit ("chip"). In a computer system with a graphics controller, the graphics controller handles various tasks associated with displaying images on a display (such as converting primitive data to pixels), freeing the CPU to perform other tasks. Moving graphics operations from the CPU to the graphics controller improves the performance of the computer system. In practice, however, the amount of improvement is generally not as great as expected. The reason is that the transfer of data between the CPU and the graphics controller becomes a bottleneck that places a limit on the amount of performance improvement that can be realized. To illustrate the effect of the data transfer bottleneck, consider that in a typical computer system the CPU theoretically requires only 2 bus clock cycles ("BCLKs") to perform a memory write command and a minimum of 4 BCLKs to perform a memory read command. In practice, however, writing to a prior art graphics controller requires 5 BCLKs and reading requires up to 8 BCLKs. During the 3–4 additional BCLKs that are required with a prior art graphics controller, the CPU does not perform any useful work. Accordingly, to fully realize the benefits of the graphics controller, there is a need to optimize data transfer between the CPU and the graphics controller.

The transfer of data between a CPU and a graphics controller involves a number of steps. These steps must be coordinated so that data is not transferred to the graphics controller faster than it can accept it and so that the CPU knows when data it has requested is available. To regulate the flow of data between the CPU and the graphics controller, the graphics controller includes a read/write control circuit that can be defined as a read/write state machine.

The read/write state machine typically has four states: An "idle" state in which the graphics controller waits for a request from the CPU; a "pause" state in which the graphics controller checks to make sure that any previous memory cycle is complete; a "request" state in which the graphics controller begins processing the memory cycle; and, an "end" state in which the graphics controller finishes processing the memory cycle. The read/write state machine transitions from state to state in a fixed sequence for each memory cycle. When the read/write state machine receives a request for a memory cycle, it moves sequentially from the idle state to the pause state to the request state to the end state. From the end state, the read/write state machine returns to the idle state where it waits for the next request for a memory cycle. During certain types or sequences of memory cycles, the read/write state machine may stay in one or more states for a longer period, but the basic state transition sequence does not change.

While the read/write state machine effectively regulates a single memory cycle, a problem arises when the CPU issues a series of consecutive commands for memory cycles. Because the state transition sequence must be fully complete before the CPU can issue a subsequent command, the CPU must wait to send a new command. This means that each command in a series of consecutive commands consumes more BCLKs than the CPU minimally requires. Because the CPU does not perform any useful work while it waits for the state transition sequence to complete, the prior art read/write state machine degrades the overall performance of the computer system.

Accordingly, there is a need for a high performance graphics controller that regulates the transmission of command information between the CPU and the graphics controller in such a way that the time that the CPU is required to wait before it can issue a new command is minimized.

BRIEF SUMMARY OF THE INVENTION

The invention disclosed herein is a high performance graphics controller. Within the scope of the invention, there is a graphics controller chip for use with an off-chip CPU issuing a plurality of commands. The graphics controller chip comprises a logic circuit adapted to respond to a first issued command from the CPU by checking whether the graphics controller chip is ready to carry out the first command. If the graphics controller chip is not ready to carry out the first command, the logic circuit continues checking while sending a signal to the CPU indicating that the graphics controller chip is ready to receive a second command from the CPU.

Preferably, if the CPU issues a second command and the graphics controller chip is still not ready to carry out the first command, the logic circuit sends a signal to the CPU indicating that the graphics controller chip is not ready to receive another command from the CPU.

Preferably, when the graphics controller chip becomes ready to carry out the first command the logic circuit delays two clock periods and, if the CPU has issued a second command, the logic circuit sends a signal to the CPU indicating that the graphics controller chip is ready to receive another command.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 6 is a block diagram illustrating a read/write controller, including a read/write state machine, within a graphics controller according to the present invention.

FIG. 7 is a state transition diagram for an embodiment of the read/write state machine of FIG. 6.

FIG. 8 is a timing diagram illustrating memory write cycles of a computer system that includes the graphics controller of FIG. 6.

DETAILED DESCRIPTION OF THE INVENTION

Figure 1:
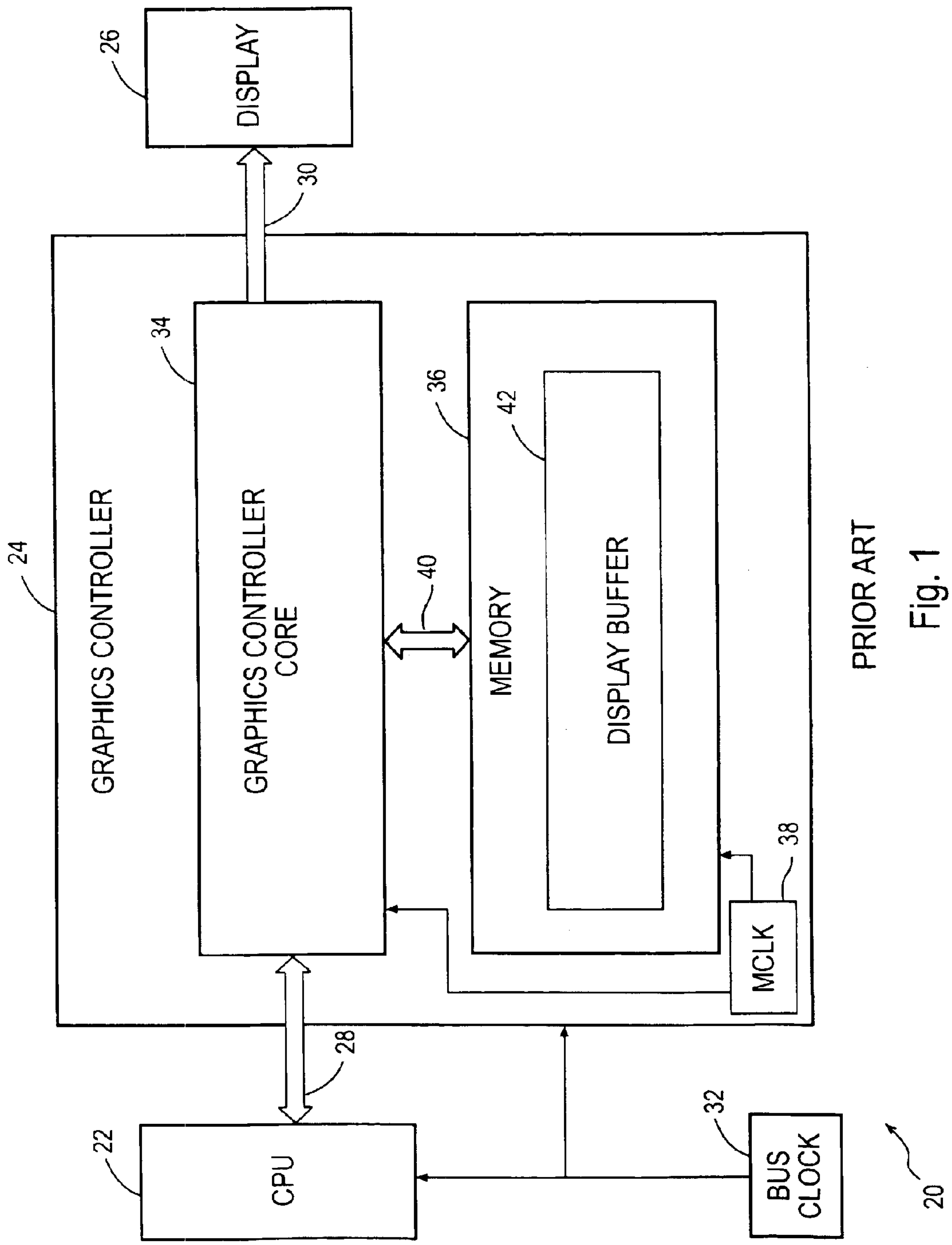
FIG. 1 is a block diagram illustrating an exemplary prior art computer system including a CPU, a display, and a graphics controller.

FIG. 1 illustrates an exemplary computer system 20 that includes a CPU 22, a graphics controller 24, and a display 26. The computer system 20 illustrates a preferred context for the present invention; however, other contexts for the invention are contemplated, but this is not essential. As mentioned, the CPU and the graphics controller are typically separate chips. In addition, controllers of types other than the graphics controller 24 are contemplated.

The graphics controller 24 is connected to the CPU 22 by a system bus 28. The graphics controller 24 is connected to the display 26 by a display bus 30. To synchronize memory cycles between the CPU 22 and the graphics controller 24, a bus clock 32 is connected to the CPU 22 and to the graphics controller core 34. A graphics controller core 34, a memory 36, and memory clock ("MCLK") 38 are included within the graphics controller 24. The graphics controller core 34 is coupled to the memory 36 by a memory bus 40. The memory clock 38 is coupled to the memory 36 and to the graphics controller core 34. The memory 36 includes the shown display buffer 42, but may also contain other types of data, such as audio data or video data.

Figure 2:
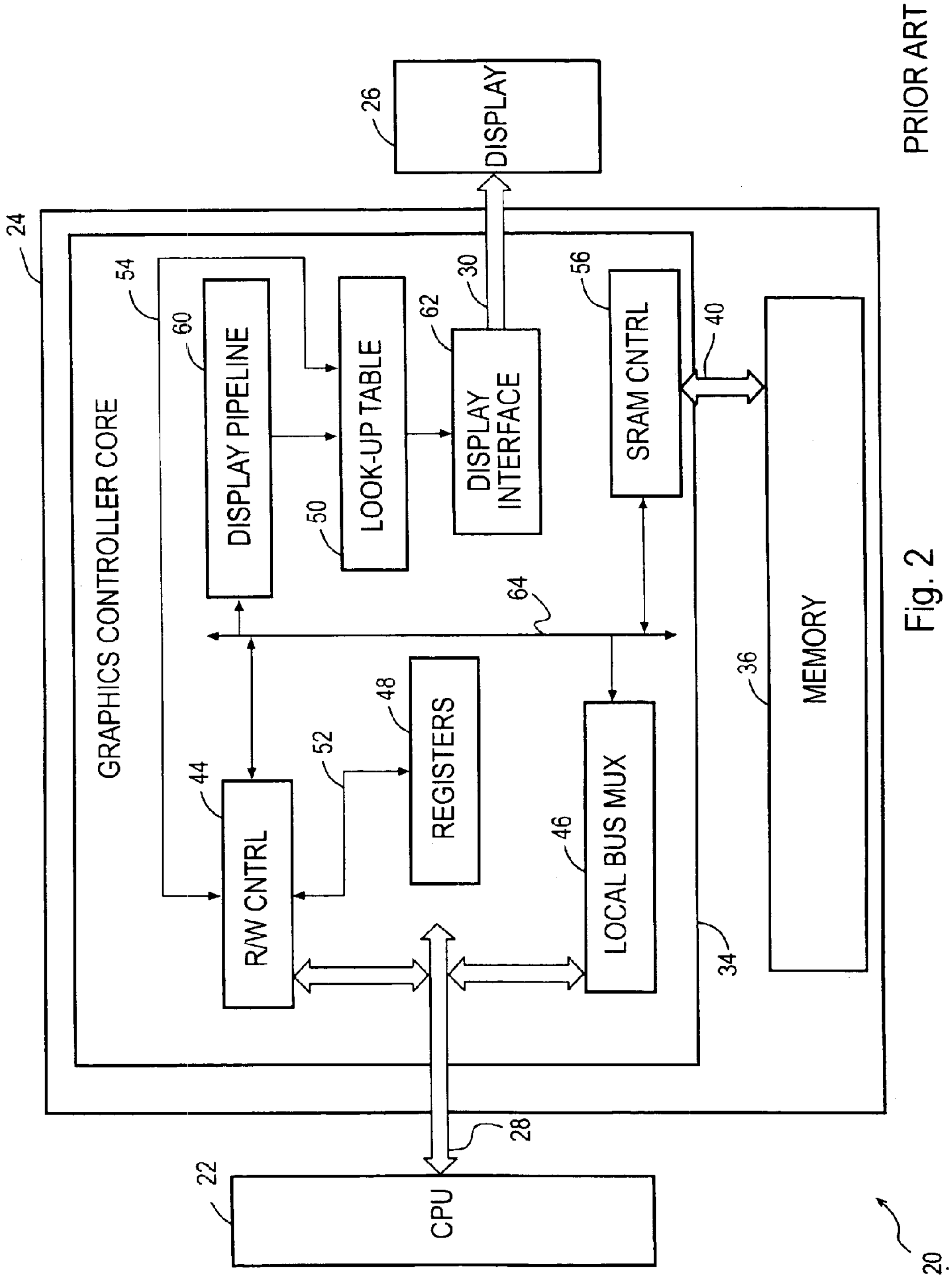
FIG. 2 is a block diagram illustrating functional blocks, including a read/write controller, within the graphics controller of FIG. 1.

FIG. 2 illustrates some of the functional blocks included within the graphics controller core 34: a read/write controller ("R/W CNTRL") 44, a local bus multiplexer ("local bus mux") 46, a set of registers 48, a look-up table 50, an SRAM controller ("SRAM CNTRL") 56, a display pipeline 60, and a display interface 62. The read/write controller 44 is coupled to the registers 48 via a register bus 52 and to the look-up table 50 via a look-up table bus 54. The read/write controller 44, the SRAM controller 56, the local bus mux 46, and the display pipeline 60 are coupled to each other via a graphics controller core bus 64. Both the read/write controller 44 and the local bus mux 46 are coupled to the system bus 28. The SRAM controller 56 is coupled to the memory 36 via the memory bus 40. The display interface 62 is coupled to the display 28 via the display bus 30. The registers 48 store configuration and other information. The look-up table 50 stores information needed for pixel processing. The SRAM controller 56 provides access and management functions for the memory 36.

Figure 3:
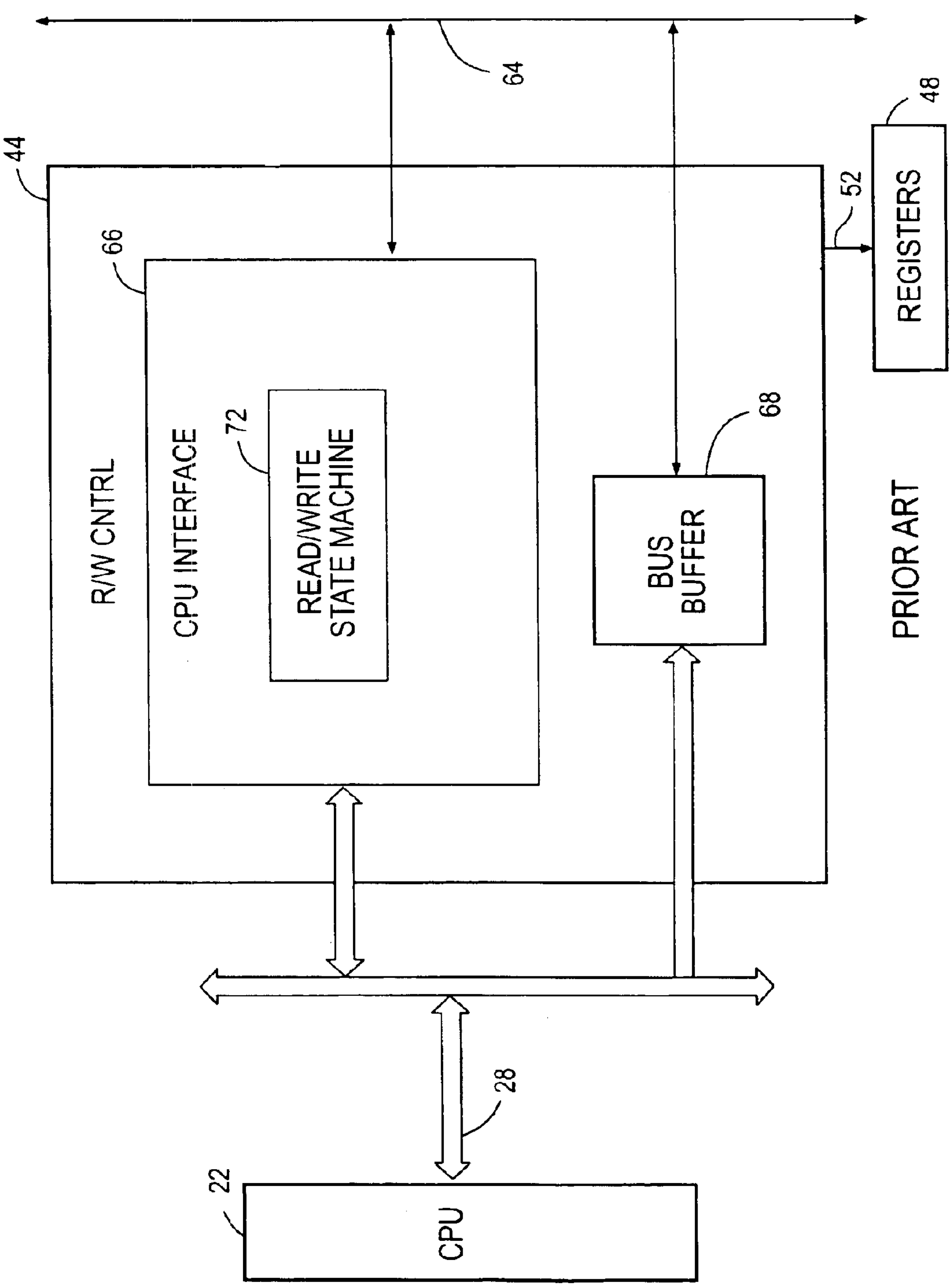
FIG. 3 is a block diagram illustrating functional blocks, including a read/write state machine, within the read/write controller of FIG. 2.

FIG. 3 is a block diagram illustrating functional blocks within the read/write controller 44 of FIG. 2. The read/write controller 44 includes a CPU interface 66 and a bus buffer 68. In addition, the CPU interface 66 includes a prior art read/write state machine 72. The CPU interface 66 monitors and places signals on the system bus 28. When the CPU issues a command, if the graphics controller 24 is ready to accept the command, the control, address, and data signals associated with the command are stored in the bus buffer 68. The graphics controller 24 then processes the command using the command information stored in the bus buffer 68. If the CPU 22 issues a write command, the memory write data is copied from the bus buffer 68 and stored in the location specified by the address stored in buffer 68. If the CPU 22 issues a read command, the requested memory read data is copied from the location specified by the address stored in buffer 68, and stored in the local bus mux 46. The CPU 22 then obtains the requested memory read data by sampling the local bus mux 46 via the system bus 28. The read/write state machine 72 is typically implemented as a logic circuit.

Figure 4:
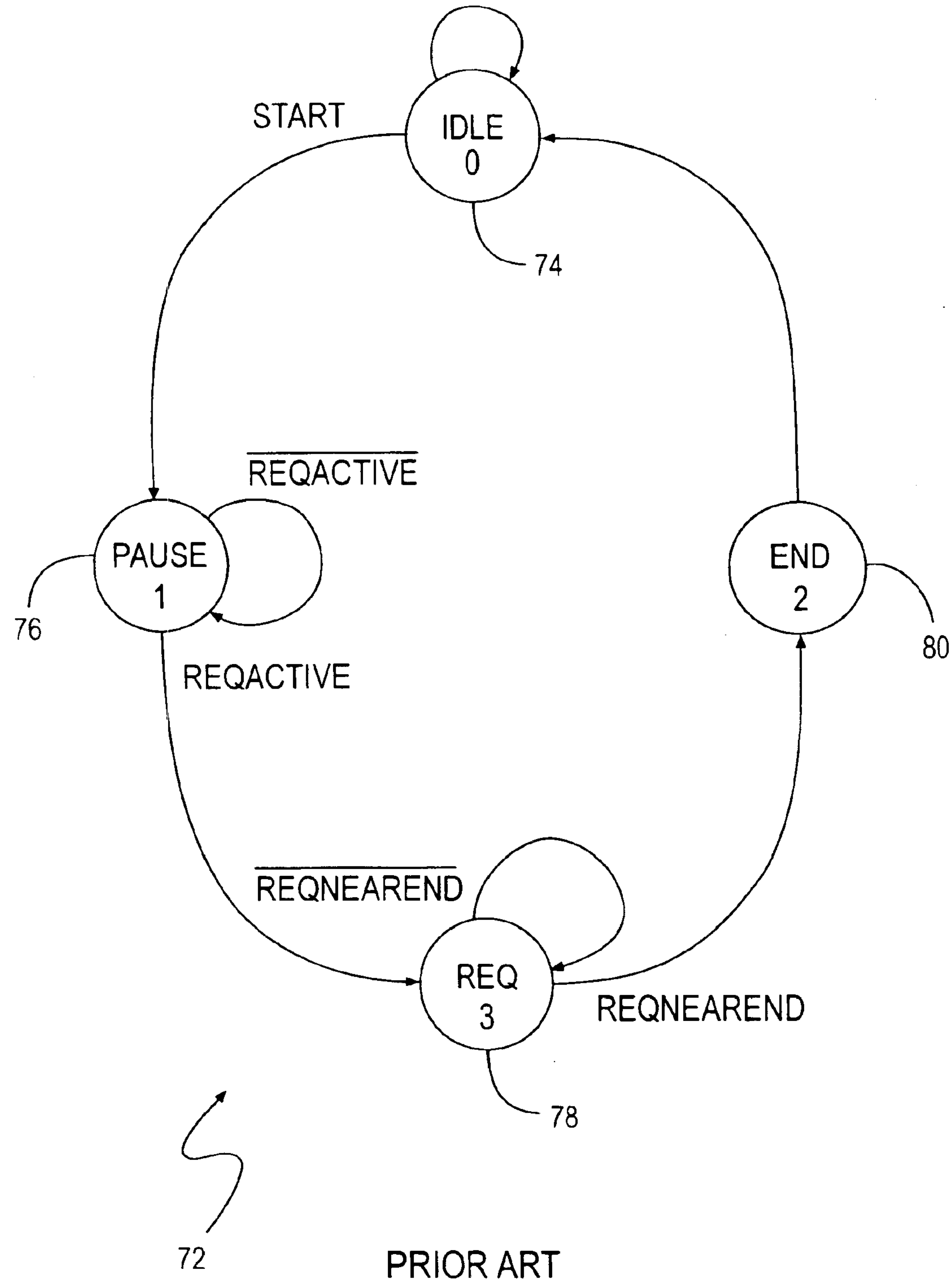
FIG. 4 is a state transition diagram for the read/write state machine of FIG. 3.

FIG. 4 provides a state transition diagram for the read/write state machine 72. In FIG. 4, each bubble represents a state. The names given the states and signals are exemplary. The state and allowed transitions from one state to another are described below.

State 0—IDLE

In the state IDLE 74, the read/write state machine 72 waits to receive a start signal (START). The state IDLE 74 is the initial state after start-up for the read/write state machine 72. When the CPU 22 asserts byte enable (BE) and chip select (CS#) signals, the CPU interface 66 decodes the signals to create the START signal to indicate that a memory cycle is requested and a command has therefore issued. (The signals BE and CS# are exemplary; other CPU's may assert different signals to signify that a command has issued.) When the read/write state machine 72 detects the START signal, a wait signal (WAIT#) is asserted and the read/write state machine 72 transitions to a state PAUSE 76. The WAIT# signal tells the CPU 22 that the graphics controller 24 is busy. The WAIT# signal prevents the CPU 22 from issuing another command and causes the CPU 22 to begin inserting wait states.

State 1—PAUSE

In the state PAUSE 76, the read/write state machine 72 checks to see whether the graphics controller 24 is ready to process another command. If a signal REQACTIVE# is asserted low, the graphics controller 24 has not yet finished processing a previous command and the read/write state machine 72 remains in the state PAUSE 76. On the other hand, if the signal REQACTIVE# is not asserted, the graphics controller 24 has finished processing the previous command and the read/write state machine 72 transitions to a state REQUEST 78.

State 3—REQUEST

In the state REQUEST 78, the read/write state machine 72 stores control, address, and data signals into the bus buffer 68 by asserting a buffer enable signal (BUF.EN). In addition, if the command is for a write cycle or a register read cycle, the signal WAIT# is de-asserted upon entering the state REQUEST 78. In the state REQUEST 78, the read/write state machine 72 generates the appropriate internal signals needed to process the command and monitors a signal REQNEAREND. The signal REQNEAREND indicates that the memory cycle is almost complete. If the signal REQNEAREND is asserted, the read/write state machine 72 transitions to a state END 80.

State 2—END

In the state END 80, the signal WAIT# is removed if the command is for a memory read cycle. In addition, other internal functions are performed during the state END 80. On the next BCLK, the read/write state machine 72 transitions from the state END 80 to the state IDLE 74.

Figure 5:
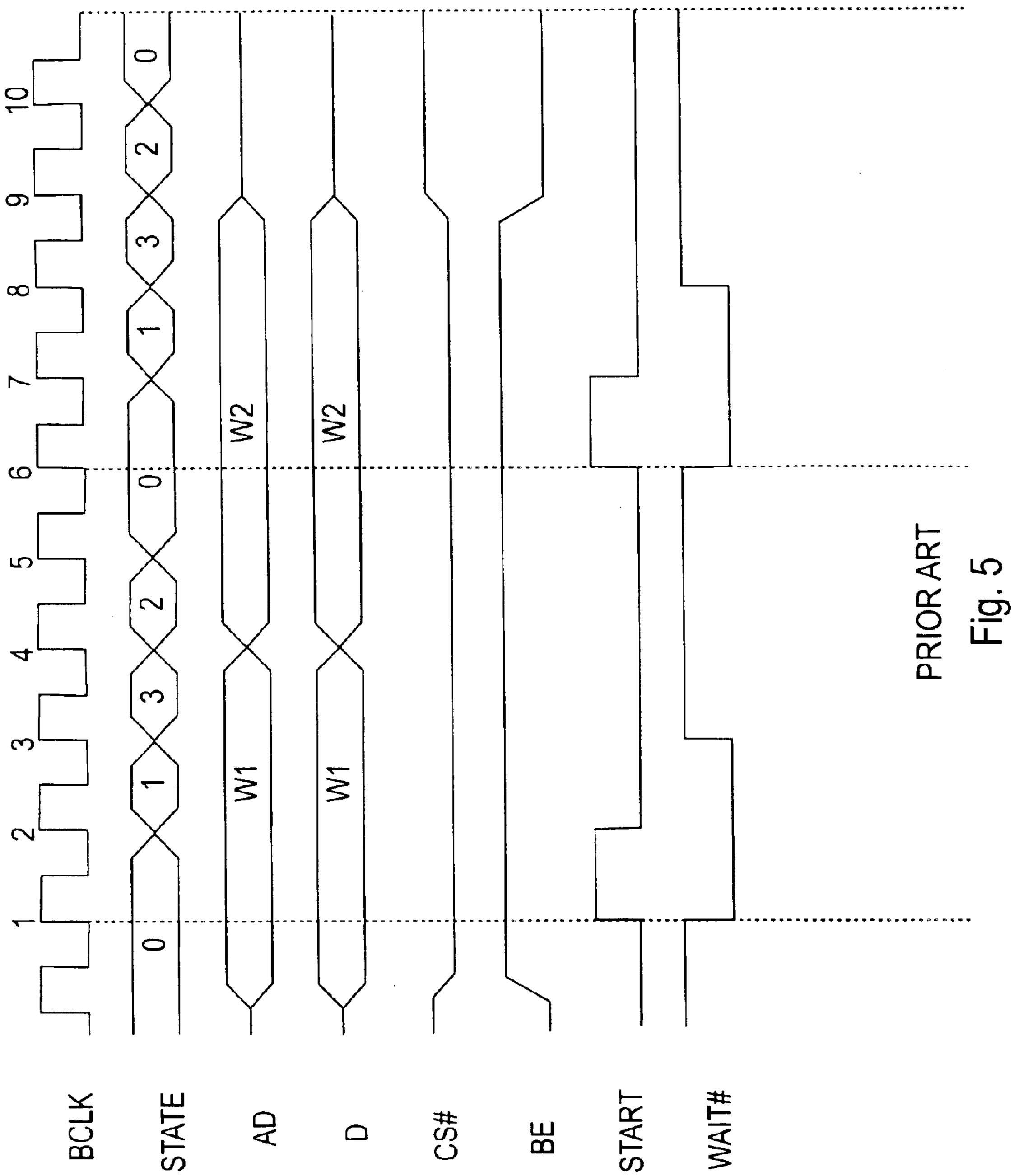
FIG. 5 is a timing diagram illustrating memory write cycles of the computer system of FIG. 1.

FIG. 5 shows a timing diagram illustrating exemplary write cycles of the computer system 20. The timing diagram in FIG. 5 shows the signal produced by the bus clock 32, the state of the read/write state machine, and various signals. Before the CPU 22 issues a command for a memory cycle, it verifies whether the signal WAIT# is asserted. As shown in FIG. 5, if the signal WAIT# is not asserted, the CPU 22 issues a command for a first memory cycle (W1) by placing address (AD), data (D), and control signals on the system bus 28. The CPU interface 66 decodes the signals BE and CS# to create the WAIT and START signals. In BCLK 2, the read/write state machine 72 transitions to the state PAUSE 76. In BCLK 3, because REQACTIVE# (not shown in FIG. 5) is not asserted, the read/write state machine 72 transitions to the state REQUEST 78 and the address, data, and control signals are latched into the bus buffer 68. In addition, in BCLK 3, the signal WAIT# is de-asserted. Moreover, in BCLK 3, the CPU 22 verifies that the signal WAIT# is not asserted. In BCLK 4, because REQNEAREND (not shown in FIG. 5) is asserted the read/write state machine 72 transitions to the state END 80. In addition, in BCLK 4, the CPU 22 issues a command for a second memory cycle (W2) by placing address, data, and control signals on the system bus 28. In BCLK 5, the read/write state machine 72 returns to the state IDLE 74 and waits for a START signal for a subsequent memory cycle. In addition, in BCLK 5, the BE and CS# signals are decoded to create a START signal for the second memory cycle (W2). The BE and CS# signals are asserted in BLCK 6. As FIG. 5 shows, a disadvantage of the read/write state machine 72 is that 5 BCLKs must elapse after the CPU 22 has issued a command before the graphics controller 24 can accept a subsequent command for the CPU 22.

Having described a prior art computer system 20, a graphics controller 124 according to the present invention for use in the computer system 20 is next described. Turning to FIG. 6, the graphics controller 124 includes a read/write controller 144. The read/write controller 144 includes a CPU interface 166 and a bus buffer 168. The CPU interface 166 includes a read/write state machine 172. The bus buffer 168 stores control, address, and data signals presented on the system bus 28 when the CPU 22 issues a command. The graphics controller 124 uses the control, address, and data signals stored in the bus buffer 168 to process issued commands.

FIG. 7 shows an exemplary read/write state machine 172 according to the present invention. The names for the states and signals are exemplary. As shown in FIG. 7, the read/write state machine 172 has four states: IDLE 174, PAUSE 176, REQUEST 178, and END 180. Except for the differences noted below, the descriptions previously provided for the states IDLE 74, PAUSE 76, REQUEST 78, and END 80 respectively describe the states IDLE 174, PAUSE 176, REQUEST 178, and END 180.

In addition, except for the differences noted below, read/write state machine 172 has the same state transitions as those previously described for read/write state machine 72. The states of the read/write state machine 82 of the present invention differs from the prior art read/write state machine 82 as follows:

State 1—PAUSE

In the state PAUSE 176, if the issued command is for a memory write cycle or a register read cycle, the WAIT# signal is de-asserted.

State 2—END

In the state END 180, the read/write state machine 172 checks to see whether a START signal has been asserted. The read/write state machine 172 will transition from the state END 180 to the state PAUSE 176 on the next BCLK if the START signal has been asserted. On the other hand, if the START signal is not asserted, the read/write state machine 172 will transition from the state END 180 to the state IDLE 174 on the next BCLK.

With the read/write state machine 172, the steps required to process a subsequent memory cycle begin in parallel with the processing of the current memory cycle. For purposes herein, two processes are executed in "parallel" if the two processes overlap in time so that the time to execute the two processes is less than the sum of the times to execute the processes individually. Preferably, the processes are executed sufficiently in parallel so that one process completely overlaps the other, i.e., the time to execute both processes is no greater than the time to execute the longer of the processes. However, complete overlap not a requirement for parallelism according to the present invention. As mentioned, the read/write state machine 172 causes the signal WAIT# to be removed earlier. The earlier removal of the signal WAIT# allows the CPU 22 to issue a command for a subsequent memory cycle in parallel with the processing to the current memory cycle. In addition, if the CPU 22 issues a command for a subsequent memory cycle as a result of the earlier removal of the signal WAIT#, the graphics controller 24 causes the signal START to be asserted 1 BCLK earlier in parallel with the processing of the current memory cycle.

FIG. 8 shows a timing diagram for exemplary memory cycles in the computer system 20 that includes the graphics controller 124 according to the present invention. For purposes of illustration, the memory cycles shown are characteristic of a write to the memory 36, the registers 48, or the look-up table 50. The advantageous timing characteristics of the graphics controller 124, however, could also be illustrated with a read cycle.

As shown in FIG. 8, in BCLK 2, the signal WAIT# is de-asserted. In BCLK 4, as the read/write state machine 172 transitions to the state END 180, the CPU 22 issues a command for a new memory cycle. In addition, in BCLK 4, the signal START is asserted. Because the START signal is asserted, the read/write state machine 172 transitions from the state END 180 to the state PAUSE 176 in BCLK 5. The first memory cycle (W1) is completed in 4 BCLKS. The second memory cycle (W2) begins in BCLK 5 and is also completed in 4 BCLKS.

An advantage of the read/write state machine 172 is that the CPU 22 is required to insert 1–3 fewer wait states than is required with the state machine 72. The read/write state machine 172 reduces the time required to perform a write cycle by 1 BCLK, a register read cycle by 3 BCLKs, and a memory write cycle by 1 BCLK. The graphics controller 124 increases the utilization of the CPU 22 and the system bus 28. As a result, the overall performance of the computer system 20 is improved.

Persons of ordinary skill in the art will readily appreciate that the read/write state machine 172 can be implemented in a number of different ways. The read/write state machine 172 is preferably implemented as a logic circuit. A read/write logic circuit may be constructed according to traditional design methods using a plurality of simple logic gates. As one skilled in the art will appreciate, the read/write logic circuit is preferably implemented by creating a source file in a hardware definition language such as VHDL or Verilog™ because the read/write logic circuit will typically require 200–300 simple logic gates. The read/write source file may by synthesized using an automated design tool to create a net-list. The net-list may be used by an automated layout tool to create a read/write logic circuit for implementation in a graphics controller chip or other ASIC. Alternatively, the net-list may be used by a device programmer to create a fuse-map that can be used to program a PLA, PLD, or other similar programmable chip to implement the read/write logic circuit. Moreover, while the present invention is preferably implemented in hardware, it will be understood that the read/write state machine 172 may be implemented in software as well. For example, the method of read/write state machine 172 may be embodied in a program of instructions that is stored on a medium that is read and executed by a machine to regulate the transmission of command information from a CPU 22 to a graphics controller. Any medium that can be read and executed by a machine, such as RAM, ROM, floppy disk, or fixed disk is contemplated.

The computer system 20 illustrates a preferred context for the present invention. As previously indicated, other contexts for the invention are contemplated. Any host device, such as a video decoder, an audio processor, a graphics controller, or a graphics controller may be substituted for the CPU 22. Moreover, the display 26 is preferably a Liquid Crystal Display; however, the present invention may be practiced without the display 26 or with any type of graphical display device or other output device, such as a CRT display, or a printer. Further, the CPU typically issues memory write commands to the memory 36, the registers 48, or the look-up table 50; however, other memory locations are contemplated. For example, a memory write command could be directed to a peripheral device, or an off-chip memory. Additionally, while the memory 36 is preferably synchronous random access memory ("SRAM"), any type of memory may be substituted for SRAM, such as DRAM. In addition, the system bus 28 may be replaced with separate busses for address, data, and control signals. Moreover, any alternative means for communicating address, data, and control information between the CPU 22 and the graphics controller 124 may be substituted for the system bus 28.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A graphics controller chip for use with an off-chip CPU issuing a plurality of commands, comprising a logic circuit adapted to respond to a first issued command from the CPU by checking whether the graphics controller chip is ready to carry out said first command and, if not, to continue said checking while sending a signal to the CPU indicating that the graphics controller chip is ready to receive a second command from the CPU.

2. The graphics controller chip of claim 1, wherein said logic circuit is further adapted so that, if the CPU issues said second command and the graphics controller chip is still not ready to carry out said first command, said logic circuit responds by sending a signal to the CPU indicating that the graphics controller chip is not ready to receive another command from the CPU.

3. The graphics controller chip of claim 1 timed by a clock, wherein said logic circuit is further adapted so that, when the graphics controller chip becomes ready to carry out said first command said logic circuit delays two clock periods and, if the CPU has issued said second command, sends a signal to the CPU indicating that the graphics controller chip is ready to receive another command.

4. A method for regulating the transmission of command information from a CPU to a graphics controller comprising the steps of:

(a) identifying a first issued command from the CPU; checking whether the graphics controller chip is ready to carry out said first command and, if not;

(b) continuing said checking, while sending a signal to the CPU indicating that the graphics controller chip is ready to receive a second command from the CPU.

5. The method of claim 4, wherein, if the CPU issues said second command and the graphics controller chip is still not ready to carry out said first command, the method further comprises sending a signal to the CPU indicating that the graphics controller chip is not ready to receive another command from the CPU.

6. The method of claim 4, further comprising clocking the graphics controller and, when the graphics controller chip becomes ready to carry out said first command, delaying two clock cycles and then, if the CPU has issued said second command, sending a signal to the CPU indicating that the graphics controller chip is ready to receive another command.

7. A state machine for regulating the transmission of command information from a CPU to a graphics controller comprising a logic circuit that, at any one time, operates in one of a plurality of states including:

(a) an idle state wherein the graphics controller waits to receive command information;

(b) a pause state representing a first state transition from said idle state that occurs in response to the CPU having issued a first command, wherein, in said first pause state, the graphics controller checks whether the graphics controller is ready to process said first command;

(c) a request state representing a state transition from said pause state wherein the graphics controller processes said first command; and (d) an end state representing a state transition from said request state that is delayed therefrom a predetermined amount, wherein said pause state represents a second state transition from said end state that occurs in response to an indication from the CPU that the CPU is ready to issue a second command.

8. The state machine of claim 7, wherein, in said pause state, the graphics controller sends a signal to the CPU indicating that the graphics controller is ready to receive said second command.

9. The state machine of claim 8, wherein, in said pause state, if the memory controller is not yet ready to process said first command and the CPU issues a second command, the graphics controller sends a signal to the CPU indicating that the graphics controller is not ready to receive another command.

10. The state machine of claim 7, wherein said idle state represents a state transition from said end state that occurs in response to a failure to receive an indication from the CPU that the CPU is ready to issue another command.

11. A system for displaying information, the system being embodied in at least first and second chips and a graphical display device, wherein said first chip comprises a CPU for issuing a plurality of commands having associated data for display by said graphical device, and wherein said second chip comprises:

(a) a first memory for storing, sequentially in time said commands;

(b) a second memory for storing the associated data for provision to said graphical display device; and (c) a logic circuit in communication with said CPU, said first memory, said second memory, and said graphical display device, wherein said CPU is adapted to control the output of said graphical display device through said logic circuit, said logic circuit being adapted to check whether said second chip is ready to process a first command stored in said first memory and, if so, to process said first command and, if not, to continue to check whether said logic circuit is ready to process said first command and, in parallel, sending a signal to said CPU indicating that said logic circuit is ready to receive a second command.

12. The system of claim 11, wherein said logic circuit is adapted, if said CPU issues said second command in response to said signal and if said second chip has not yet become ready to process said first command, to send a signal to said CPU indicating that said second chip is not ready to receive another command.

13. The system of claim 12, wherein said logic circuit is adapted, if said second chip thereafter becomes ready to process said first command, to store said second command in said first memory and to send a signal to said CPU indicating that said second chip is ready to receive another command.

14. A medium readable by a machine embodying a program of instructions executable by the machine to perform a method for regulating the transmission of command information from a CPU to a graphics controller chip comprising the steps of:

(d) identifying a first issued command from the CPU;

(e) checking whether the graphics controller chip is ready to carry out said first command and, if not;

(f) continuing said checking, while sending a signal to the CPU indicating that the graphics controller chip is ready to receive a second command from the CPU.

15. The medium of claim 14, wherein, if the CPU issues said second command and the graphics controller chip is still not ready to carry out said first command, the method further comprises sending a signal to the CPU indicating that the graphics controller chip is not ready to receive another command from the CPU.

16. The medium of claim 14, further comprising clocking the graphics controller and, when the graphics controller chip becomes ready to carry out said first command, delaying two clock cycles and then, if the CPU has issued said second command, sending a signal to the CPU indicating that the graphics controller chip is ready to receive another command.

* * * * *

UNITED STATES PATENT AND TRADEMARK OFFICE

CERTIFICATE OF CORRECTION

PATENT NO. : 6,952,216 B2
DATED : October 4, 2005
INVENTOR(S) : Barinder Singh Rai It is certified that error appears in the above-identified patent and that said Letters Patent is hereby corrected as shown below:

Column 8,
Line 51, change “memory” to -- graphics --.

Signed and Sealed this

Eleventh Day of April, 2006

JON W. DUDAS
*Director of the United States Patent and Trademark Office*